(No Model.)

W. T. LYONS.
ICE MACHINE.

No. 247,772. Patented Oct. 4, 1881.

WITNESSES:
Chas. Nida
C. Sedgwick

INVENTOR:
W. T. Lyons
BY Munn & Co
ATTORNEYS.

UNITED STATES PATENT OFFICE.

WILLIAM T. LYONS, OF DECHERD, TENNESSEE.

ICE-MACHINE.

SPECIFICATION forming part of Letters Patent No. 247,772, dated October 4, 1881.

Application filed February 11, 1881. (No model.)

*To all whom it may concern:*

Be it known that I, WILLIAM T. LYONS, of Decherd, in the county of Franklin and State of Tennessee, have invented a new Improvement in Ice-Machines, of which the following is a full, clear, and exact description.

The object of my invention is to produce cold by the expansion of air within pipes placed in a chamber in which it is desired to produce a low temperature or freeze water.

My invention consists in two cylinders or pumps connected with a series of pipes, with valves arranged for exhausting the air from the pipes to one cylinder and regulating its admission to the pipes from the other cylinder. The cylinders vary in size, the exhaust being the larger, and have pistons connected for simultaneous operation, whereby a continuous passage of rarefied air through the pipes is obtained without any compression.

Figure 1:
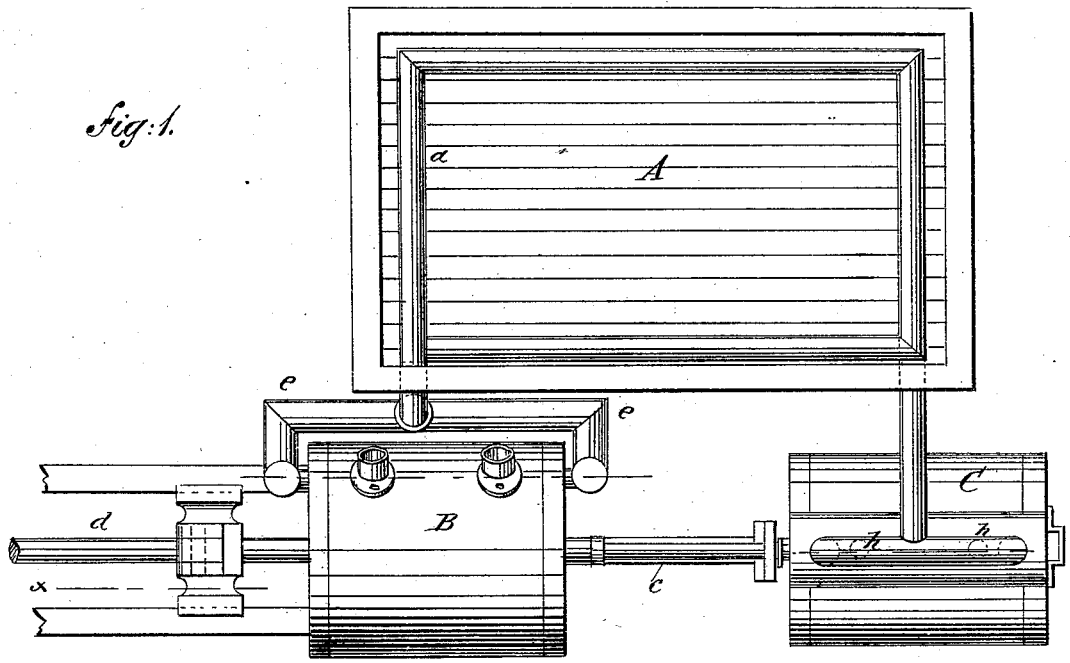
Figure 2:
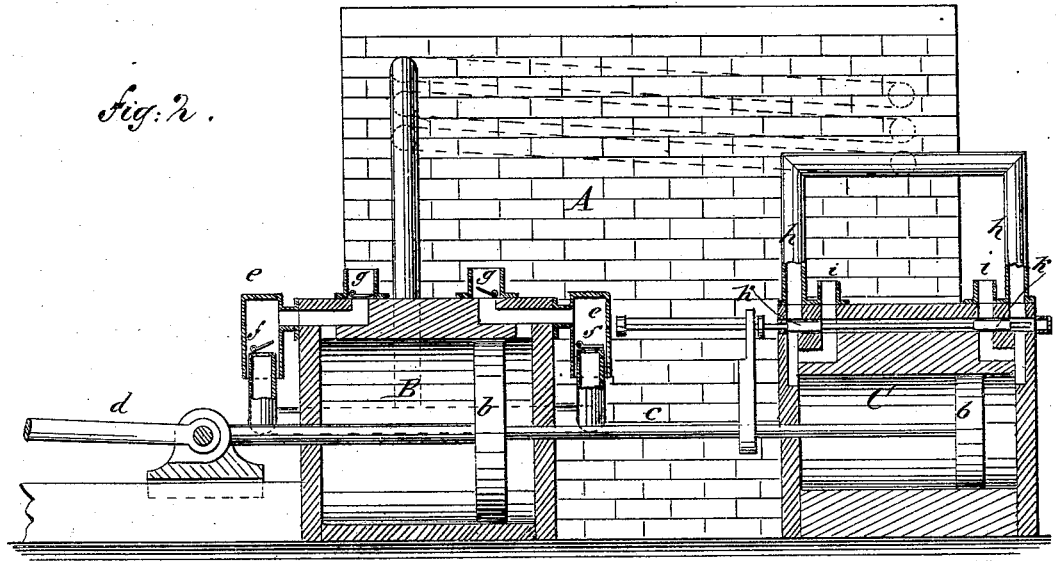

In the accompanying drawings, Figure 1 is a plan view of the apparatus, and Fig. 2 is a vertical section on line $x\ x$ of Fig. 1.

Similar letters of reference indicate corresponding parts.

A is the refrigerating-chamber, containing pipes $a$, arranged continuously in any desired manner and to any suitable extent.

B is the exhausting-cylinder, and C the air-supply cylinder. These are placed in line and have their pistons $b\ b$ connected by a rod, $c$, in the same manner as a direct-acting engine.

$d$ is a pitman from suitable power, connected to the rod of the larger cylinder. The exhausting-cylinder B is the larger of the two, and may have two, three, or more times the capacity of cylinder C. It connects from its ends by pipes $e\ e$ with the upper end of the series of pipes $a$, in which pipes are valves $f$, hung to admit air to cylinder B, and the pipes $e$ have openings to the outer air, fitted with valves $g$, that prevent inlet of atmospheric air to the cylinder. Cylinder C connects from its ends by pipes $h$ with the lower end of pipes $a$, and there are two air-inlet openings, $i$, connecting by ports with cylinder C. The valves of cylinder C are slide-valves $k\ k$, which may be of any suitable character, and are operated simultaneously from rod $c$ to close pipe $h$ and open inlet $i$ at one end, while pipe $h$ is opened and inlet $i$ closed at the other end. With two pumps thus arranged, the one exhausting air from pipes $a$ and the other regulating the admission of air to the pipes, the rarefaction of air in the pipes will correspond with the ratio of the capacities of the two cylinders. For instance, if the exhauster B have four times the capacity of cylinder C on commencing operation, the density of the air in pipes $a$ will be reduced at each move in the pistons until it has about one-fourth the density of atmospheric air. When this point is reached the large cylinder will remove the air from the pipes only as fast as it is admitted through the small cylinder. The air in the small cylinder will be expanded to four times its density on admission to the pipes at each move of the pistons. The atmospheric air is thus continuously drawn in, expanded, and, passing through the series of pipes $o$, enters the large cylinder, and is forced out through valves $g$. It passing through the rarefied air absorbs more or less heat, and reduces the temperature in chamber A to the extent required either for cooling purposes or freezing water.

It will be seen that there is no compression of air, but the atmospheric air, being more dense than the air in cylinder C, acts with pressure on the piston on one side or the other, thus aiding the operation.

The cylinder A and the pipes outside of chamber A should be inclosed with wood or other suitable non-conducting material.

Having thus described my invention, what I claim as new, and desire to secure by Letters Patent, is—

1. The apparatus for refrigerating, consisting of an air-exhausting pump and an air-supply pump separately connected with a series of pipes in a refrigerating-chamber, for obtaining circulation of air through said pipes by operation of the pumps and the exhauster, being of greater capacity than the supply-pump, whereby the air is rarefied, all substantially as shown and described.

2. In apparatus for refrigerating by rarefaction of atmospheric air, the cylinder B, provided with pipes $e\ e$ and valves $f\ g$, cylinder C, provided with pipes $h$, inlet-opening $e$, and slide-valve $k$, connected with pistons $b\ b$, and the chamber A, provided with pipes $a$, connected to the pipes $e\ h$ of the cylinders, combined for operation substantially as shown and described.

W. T. LYONS.

Witnesses:
 DANIEL LENEHAN,
 GEO. C. BASS.